July 30, 1929.  A. L. JACKSON  1,722,576
ICE SCORING MACHINE
Filed Jan. 3, 1929
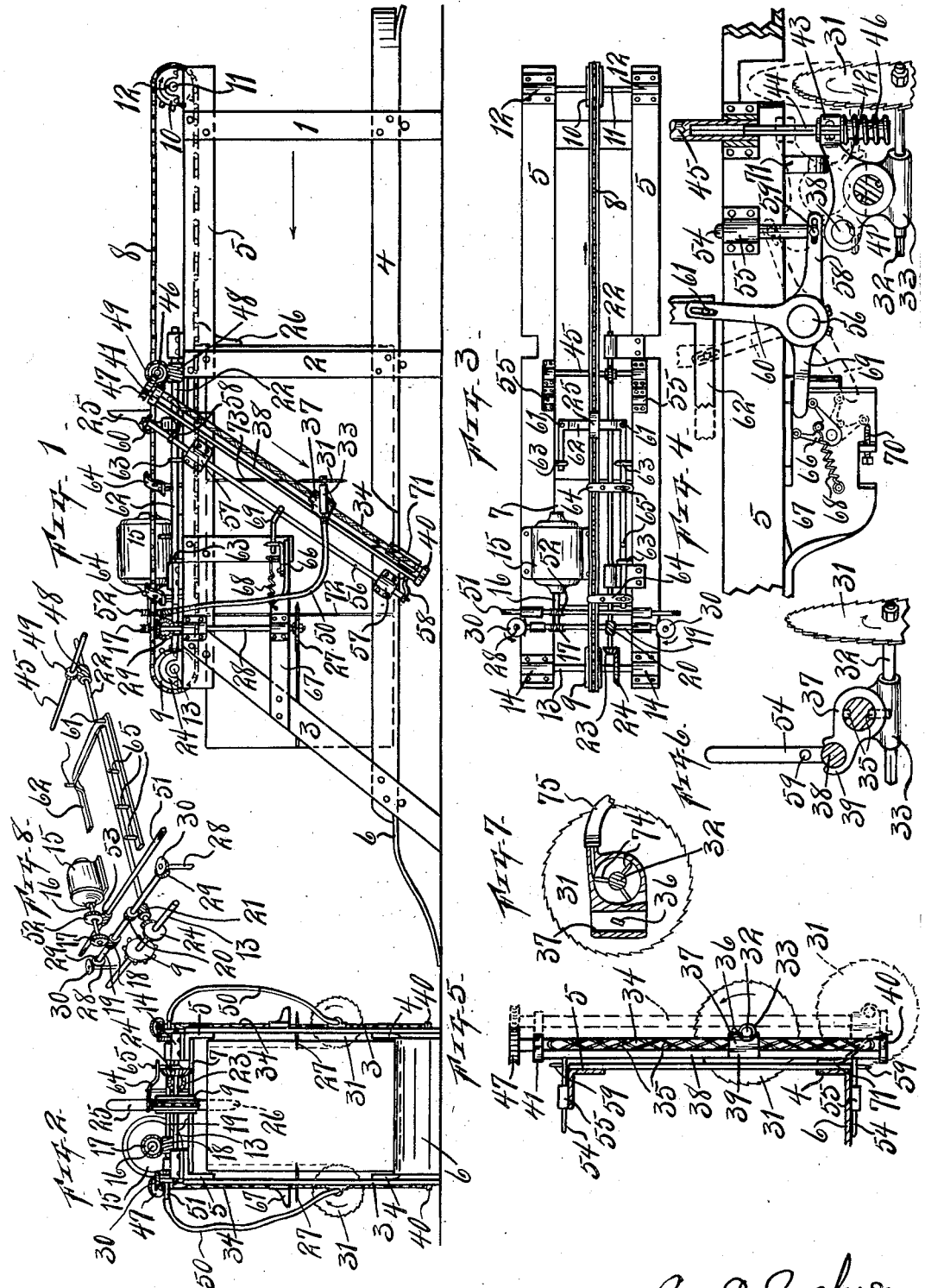

Patented July 30, 1929.

1,722,576

UNITED STATES PATENT OFFICE.

ANDREW L. JACKSON, OF FORT WORTH, TEXAS.

ICE-SCORING MACHINE.

Application filed January 3, 1929. Serial No. 330,049.

This invention relates to machines for scoring ice; and the object is to provide a simple machine which will be economical as compared with other ice scoring machines. The advantage of this invention is that the machine can be manufactured at relatively small cost. Another advantage is that blocks of ice may be scored vertically and horizontally in a single continuous movement through the machine and there may be as many scores made both vertically and horizontally as may be desired for preparing different sizes of blocks of ice. Another advantage is in the simplicity in the operation of the machine and the saving in time of scoring the ice blocks. Other objects and advantages will be fully explained in the following description and the invention will be more particularly pointed out in the claims.

Reference is had to the accompanying drawings which form a part of this application.

Fig. 1 is a side elevation of the ice scoring machine.

Fig. 2 is an end elevation of the same.

Fig. 3 is a plan view of the same.

Fig. 4 is a plan view of the means for shifting the driving means and the saws.

Fig. 5 shows a detail of the driving shaft.

Fig. 6 is a detail view of the traveling bearing for the saw which moves vertically.

Fig. 7 is a view of a gearing for using a different motive power.

Fig. 8 is a diagrammatic view of certain driving gear and shifting mechanism.

Similar characters of reference are used to indicate the same parts throughout the several views.

This machine is provided with any suitable frame having upright members in pairs 1 and 2 and inclined members 3. Lower longitudinal beams 4 are connected to the members 1, 2, and 3. Upper longitudinal beams 5 are attached to the upper ends of the members 1, 2, and 3. The members 4 are simply the upturned flanges of the platform 6. A platform 7 is attached to the beams 5 and supports the operating mechanism. An endless conveyor 8 is mounted on wheels 9 and 10, the latter being an idler provided with a shaft 11. The shaft 11 is journaled in bearings 12 which are attached to the beams 5. The wheel 9 is provided with a shaft 13 which is journaled in bearings 14 which are attached to the beams 5. The shaft 13 is driven by gearing from a motor 15 which is mounted on platform 7. The motor 15 is provided with a shaft 16 and a worm gear wheel 17 is rigid with the shaft 16 and drives a worm gear wheel 18 which is rigid with a shaft 19. A worm gear wheel 20 is rigid with shaft 19 and drives a worm gear wheel 21 which is rigid with shaft 22. A bevel gear 23 is rigid with shaft 22 and drives a bevel gear wheel 24 which is rigid with shaft 13 which drives the gear wheel 9 for driving the conveyor 8. The conveyor 8 is provided with impellers 25 and 26 for moving the blocks of ice through the machine.

Provision is made for scoring the blocks of ice horizontally. Saws 27 are rigid with vertical shafts 28. The shafts are driven from the shaft 19 by means of gear wheels 29 which are rigid with shaft 19 and mesh with wheels 30 which are rigid with shafts 28.

The vertical scoring is accomplished by traveling saws 31. The saws 31 are rigid with shafts 32 which are journaled in bearings 33. The saws 31 and their shafts 32 are moved by revolving shafts 34. Each shaft 34 is provided with an endless groove 35. A lug 36 is rigid with the bearing 37. The shafts 34 revolve in bearings 37 which are moved by the lugs 36 which project into the grooves in the shafts 34. The bearings 37 are prevented from revolving with the shafts 34. A guide 38 is provided for each shaft 34. Each bearing 37 is provided with a projecting guiding arm 39 which has a bearing for engaging the guide 38. The arm 39 simply slides on the guide 38 and so prevents the bearings 33 and 37 from revolving with the shaft 34. The guide 38 carries bearings 40 and 41 for the shaft 34, both bearings rigid with the guide 38. Each bearing 41 has a projecting bearing arm 42 which carries a bearing 43 for a driving shaft 44. The shaft 44 telescopes in the shaft 45. A worm wheel 46 is rigid with shaft 44 and drives a worm gear wheel 47 which is rigid with the shaft 34. The bearing 37 and bearing 33 travel between the bearings 40 and 41. The shaft 45 is driven from the shaft 22 by means of a gear wheel 48 which is rigid with shaft 22 and a gear wheel 49 which is rigid with shaft 45. As each saw 31 moves downwardly and upwardly it is continuously driven by a flexible shaft 50. Each shaft 50 is fixedly connected with a saw shaft 32 and the other end of the shaft 50 is driven by a shaft 51 to which the shaft 50 is fixedly connected. The shaft 51 is driven from shaft 16 by means of a gear wheel 52 which is rigid with shaft 16 and a gear 53 which is rigid with the shaft 51.

The shaft 34 and its guide 38 and saw 31 with their gearing and cooperating parts constitute a unit for vertical scoring and each side of the machine is provided with such vertical scoring unit. See Fig. 2.

Means are provided for laterally shifting each vertical scoring unit so that the saws may be moved out of the path of the blocks of ice when the saws are being moved back to starting position. By such provision the saws can be continuously driven.

The guides 38 are provided with arms 54 which are rigid therewith and the arms 54 are parallel to each other. Guides 55 are rigid with the upper and lower frame members of the machine and the arms 54 and slidable in the guides 55 so that the guide 38 can be shifted laterally.

An oscillating shaft 56 is journaled in bearings 57 on the upper and lower frame members 5 and 6 respectively. The shaft 56 is provided with arms 58 which have slots in their ends and lugs 59 are rigid with the arms 54 and project into the slots in the arms 58. The shaft 56 is parallel to the guide 38 and shaft 34. The shaft 56 has an arm 60 rigid therewith and the arm is provided with a slot in the end thereof. The arm 60 engages a lug 61 which is rigid with a shifting member 62 which is slidably mounted in guides 63 which are mounted on the upper frame members 5. Levers 64 are fulcrumed on the platform 7 and have slots in their work ends to receive lugs 65 which are rigid with the shifting member 62. The operated ends of the levers 64 project into the path of the impellers carried by the endless conveyor 8. When the lugs or impellers 25 and 26 engage the levers 64, the levers are actuated to move the shifting member 62 for oscillating the shaft 56 which will bring the saws 31 into scoring position. The saws 31 are held in scoring position by an off-center trip 66 which is pivotally mounted on a bracket 67. The trip is held against movement by a spring 68. The trip holds an arm 69 which is rigid with the shaft 56. In the drawings, Fig. 4, the full line shows the parts out of scoring position. The dotted outline shows the parts in scoring position. The depth of scoring may be controlled by a set screw 70 which can vary the distance of travel of the trip 66. The spring 68 holds the saws 31 either in or out of scoring position.

The scoring units are automatically shifted laterally at the end of a scoring operation. The bearings 37 strike spring steel shifting devices 71. The scoring units slide on the arms 54. As soon as the scoring units are shifted to non-scoring positions, the saws start back upwardly automatically, the lugs 36 following the endless grooves in the shafts 34. When the saws reach their upper limit, they are automatically shifted to scoring positions. The impellers 25 and 26 are so timed as to strike one of the levers 64 when the scoring units are to be shifted laterally towards the sides of the machine to bring the scoring units in scoring positions.

The arrow heads in Fig. 1 show the direction of the movement of the ice blocks. The drawings show one score 72 already made and another score 73 partly completed. In this machine the saws 31 are set vertically and the driving and guiding devices for moving the saws upwardly and downwardly are set at inclines and the amount of inclination must be timed with the speed of movement of the blocks of ice in order that the scoring devices may have the proper motion to score the ice vertically as the blocks move horizontally through the machine. The levers 64 and the impellers 25 and 26 may be adjusted to score the blocks of ice as many times as may be desired, for making ice blocks of different weights.

Instead of the flexible shafts for driving the saws, an air motor may be used for this purpose and the operation will otherwise be the same. A wind-wheel 74 is mounted in the housing 37 and a hose 75 is provided for furnishing air for driving the wind-wheel.

It is apparent that various changes in the sizes, proportions, construction, and arrangement of the several parts may be made without departing from my invention.

More scoring units may be provided on each side of the machine if required.

What I claim, is,—

1. An ice scoring machine having means for moving blocks of ice horizontally therethrough, means for scoring the blocks of ice horizontally as the blocks move through the machine, and saws for scoring the ice blocks vertically during the same horizontal movement.

2. An ice scoring machine having means for moving blocks of ice horizontally therethrough, means for scoring the blocks of ice horizontally as the blocks move through the machine, and scoring units including saws set vertically therein for scoring blocks of ice vertically as the blocks of ice are moved horizontally through the machine and scoring vertically simultaneously with the horizontal scoring.

3. An ice scoring machine having means for moving blocks of ice horizontally therethrough, and scoring units including saws set vertically therein for scoring the blocks of ice vertically as the blocks are moved horizontally through the machine.

4. An ice scoring machine having means for moving blocks of ice horizontally therethrough, scoring units including saws set vertically therein for scoring the blocks of ice vertically as the blocks are moved horizontally through the machine, and means for elevating said units and saws as the blocks are moved horizontally through the machine.

5. An ice scoring machine having means for moving blocks of ice therethrough horizontally, scoring means including saws set horizontally therein, scoring units including saws set vertically therein, for scoring blocks of ice vertically as the vertically set saws are moved at an incline in the machine, means for moving said units at an incline forwardly, and means for driving the saws while the saws move vertically.

6. An ice scoring machine having means for moving blocks of ice horizontally therethrough, scoring units provided with saws for scoring ice vertically as the blocks of ice are moved horizontally through the machine, means for lowering and elevating said scoring units, and means for driving said saws while being moved vertically.

7. An ice scoring machine having means for moving blocks of ice horizontally therethrough, scoring units for scoring blocks of ice vertically as the blocks of ice are moved horizontally through the machine including saws set vertically therein and inclined shafts provided with endless threads for lowering and elevating said units, and means for continuously driving said saws during their vertical movement.

8. An ice scoring machine having means for moving blocks of ice therethrough horizontally, scoring units for scoring blocks of ice vertically as the blocks of ice are moved horizontally through the machine including saws set vertically in said units and inclined shafts provided with endless threads for lowering and elevating said units, means for continuously driving said units during their movements, and means for automatically shifting said units into and out of scoring positions.

9. An ice scoring machine having means for moving blocks of ice therethrough horizontally, scoring units for scoring blocks of ice vertically as the blocks are moved horizontally through the machine, means for lowering and elevating said units, means for automatically shifting said units transversely into and out of scoring positions, and means for continuously operating said scoring units during their vertical movement.

10. An ice scoring machine having means for moving blocks of ice horizontally therethrough, scoring units for scoring blocks of ice vertically during the horizontal movement of the blocks of ice through the machine, each unit consisting of a bearing, a saw shaft horizontally journaled therein, a vertically arranged saw rigid with said shaft, an inclined bearing, an inclined shaft in said bearing provided with an endless thread, a lug rigid with said bearing and projecting in said thread, means for preventing said inclined bearing from turning with said inclined shaft, means for driving said inclined shaft, and means for driving said saw shaft.

11. An ice scoring machine having means for moving blocks of ice horizontally therethrough, scoring units including saws, means for moving said units downwardly and forwardly in proportion to the horizontal forward movement, and said saws carried by said units for scoring the ice blocks vertically during the horizontal movement of the ice blocks.

12. An ice scoring machine having means for moving blocks of ice horizontally therethrough, scoring units including saws set vertically thereon and means for moving said units downwardly and forwardly in proportion to the forward horizontal movement of the blocks of ice for scoring the ice blocks vertically, and means for scoring the ice blocks horizontally simultaneously with the vertical scoring.

13. An ice scoring machine having means for moving blocks of ice horizontally therethrough, means for scoring the blocks of ice horizontally as the blocks are moved through the machine, scoring units including saws for scoring the blocks of ice vertically simultaneously with the horizontal scoring, and means for varying the depth of the vertical scoring.

14. An ice scoring machine having means for moving blocks of ice horizontally therethrough, means for scoring the blocks of ice horizontally as the blocks are moved through the machine, scoring units including saws for scoring the ice blocks vertically simultaneously with the horizontal scoring, and means for automatically bringing said units into scoring position and maintaining the same in scoring position and for automatically returning the scoring units to starting position after a scoring operation.

In testimony whereof, I set my hand, this 1st day of January, 1929.

ANDREW L. JACKSON.